US011997578B2

(12) United States Patent
Hildebrant et al.

(10) Patent No.: US 11,997,578 B2
(45) Date of Patent: May 28, 2024

(54) METHOD AND APPARATUS FOR INDOOR MAPPING AND LOCATION SERVICES

(71) Applicants: AT&T Intellectual Property I, L.P., Atlanta, GA (US); AT&T Mobility II LLC, Atlanta, GA (US)

(72) Inventors: David Hildebrant, Frisco, TX (US); Mingwun Li, Dallas, TX (US); Shih-Ming Wang, Sammamish, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 136 days.

(21) Appl. No.: 17/467,956

(22) Filed: Sep. 7, 2021

(65) Prior Publication Data

US 2023/0012619 A1    Jan. 19, 2023

Related U.S. Application Data

(60) Provisional application No. 63/223,310, filed on Jul. 19, 2021.

(51) Int. Cl.
*H04W 4/90* (2018.01)
*G01C 21/00* (2006.01)
(Continued)

(52) U.S. Cl.
CPC ............ *H04W 4/90* (2018.02); *G01C 21/206* (2013.01); *G01C 21/3841* (2020.08); *G06F 3/14* (2013.01); *G06F 16/93* (2019.01); *H04W 4/029* (2018.02)

(58) Field of Classification Search
CPC ....... H04W 4/90; H04W 4/029; H04W 4/021; H04W 4/38; G01C 21/206; G01C 21/3841; G01C 21/383; G06F 3/14; G06F 16/93
See application file for complete search history.

(56) References Cited

U.S. PATENT DOCUMENTS

2012/0105214 A1\* 5/2012 Sanders .................. H04L 67/63
455/466
2013/0054513 A1\* 2/2013 Jones .................... G06F 16/972
707/607

(Continued)

OTHER PUBLICATIONS

"Spin Indoor Mapping", www.sanborn.com; The Sanborn Map Company, Inc., 2020, 6 pp.

*Primary Examiner* — Umair Ahsan
(74) *Attorney, Agent, or Firm* — Guntin & Gust, PLC; Mark Wilinski

(57) ABSTRACT

Aspects of the subject disclosure may include, for example, receiving, over a network from a plurality of mobile devices via a plurality of installed SDKs, sensor data captured by one or more sensors of the plurality of mobile devices, where the sensor data includes geomagnetic data captured within a particular building; providing, over the network, the sensor data to a geomagnetic mapping server to enable generation of a geomagnetic footprint for the particular building that is aggregated with indoor mapping data for the particular building and stored as a map in a mapping repository; and providing, over the network, the map of the particular building to a communication device for presentation at the communication device along with real-time locations of first responders in the particular building, where the real-time locations are determined according to real-time sensor data including real-time geomagnetic data captured by sensors of the first responders. Other embodiments are disclosed.

19 Claims, 9 Drawing Sheets

(51) Int. Cl.
*G01C 21/20* (2006.01)
*G06F 3/14* (2006.01)
*G06F 16/93* (2019.01)
*H04W 4/029* (2018.01)

(56) References Cited

U.S. PATENT DOCUMENTS

2014/0364146 A1* 12/2014 Mirzaei ................ H04W 4/021
   455/456.2
2020/0103529 A1* 4/2020 Yeon ................... G01S 5/02522
2021/0055372 A1* 2/2021 Rauhala ................ H04W 4/029

* cited by examiner

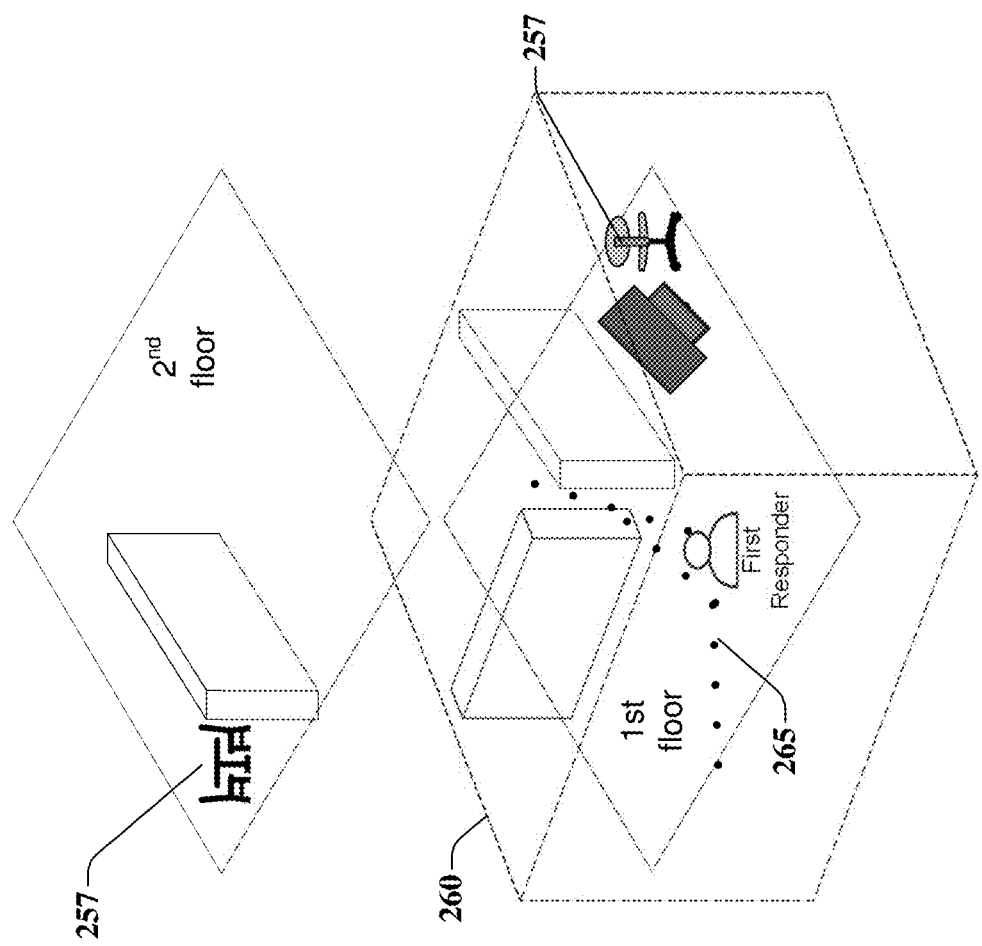
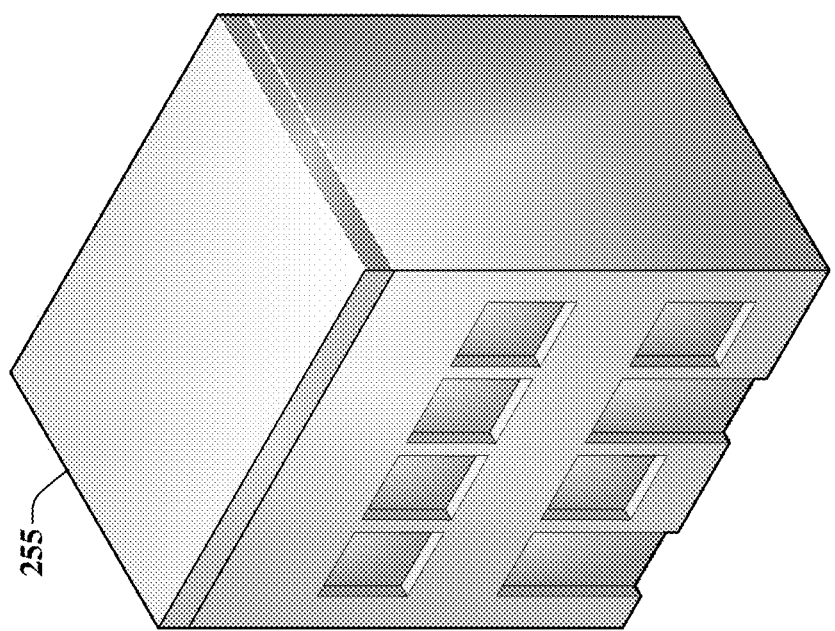
FIG. 2B

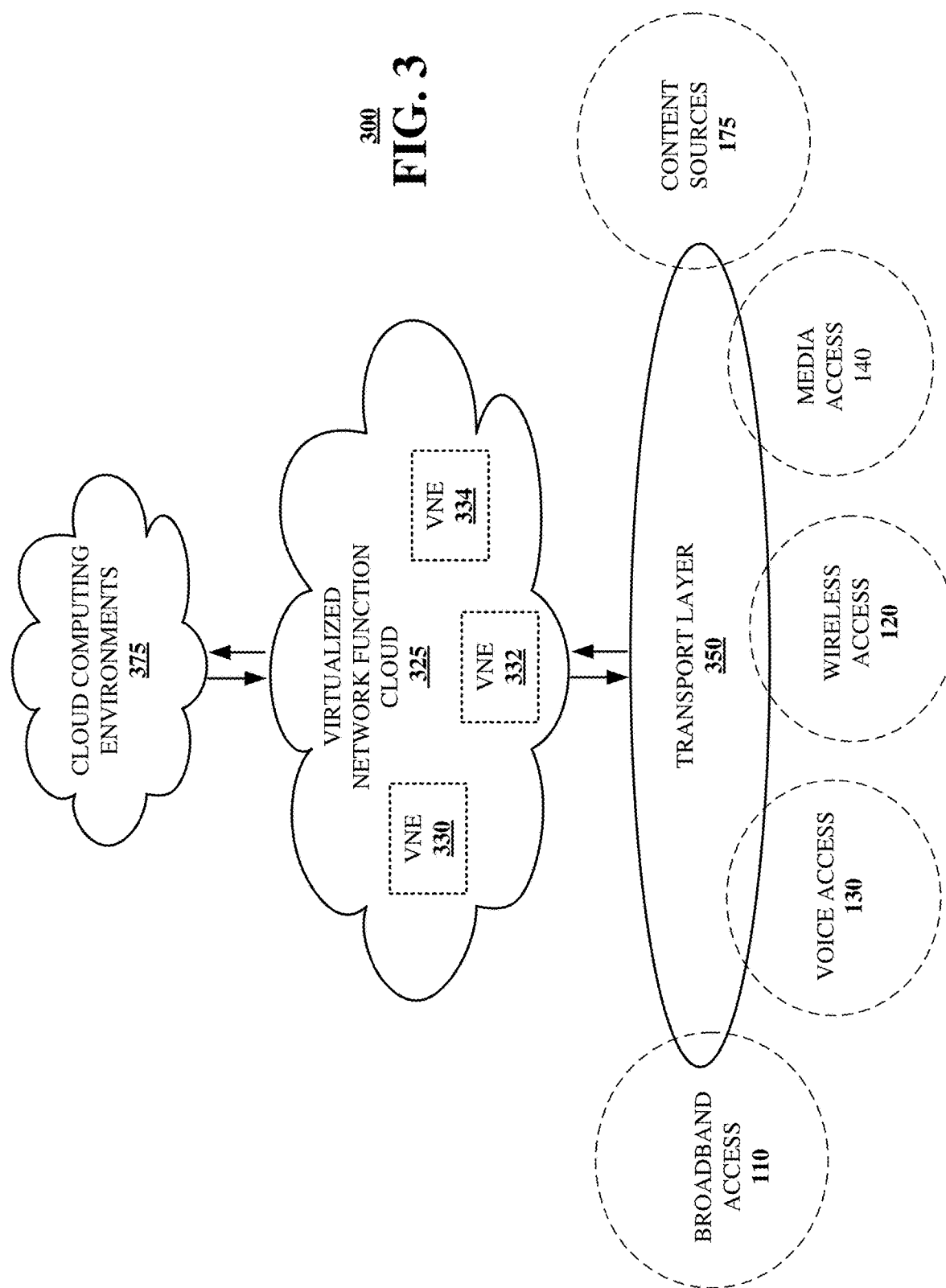

METHOD AND APPARATUS FOR INDOOR MAPPING AND LOCATION SERVICES

CROSS-REFERENCE TO RELATED APPLICATION(S)

The present application claims priority to U.S. Provisional Application No. 63/223,310, filed Jul. 19, 2021. All sections of the aforementioned application(s) and/or patent(s) are incorporated herein by reference in their entirety.

FIELD OF THE DISCLOSURE

The subject disclosure relates to a method and apparatus for indoor mapping and location services.

BACKGROUND

Today, many public safety agencies (e.g., firefighters) rely on 2D paper maps of the buildings they enter during an incident or emergency call. There is no national aggregated building database that all public safety agencies can rely upon. Additionally, existing indoor mapping providers often rely on Wi-Fi AP reported locations. However, this model cannot be relied upon when power to a building goes out such as in an emergency incident scenario.

BRIEF DESCRIPTION OF THE DRAWINGS

Reference will now be made to the accompanying drawings, which are not necessarily drawn to scale, and wherein:

FIGS. 2A and 2B, 2D are block diagrams illustrating example, non-limiting embodiments of a system and GUIs functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
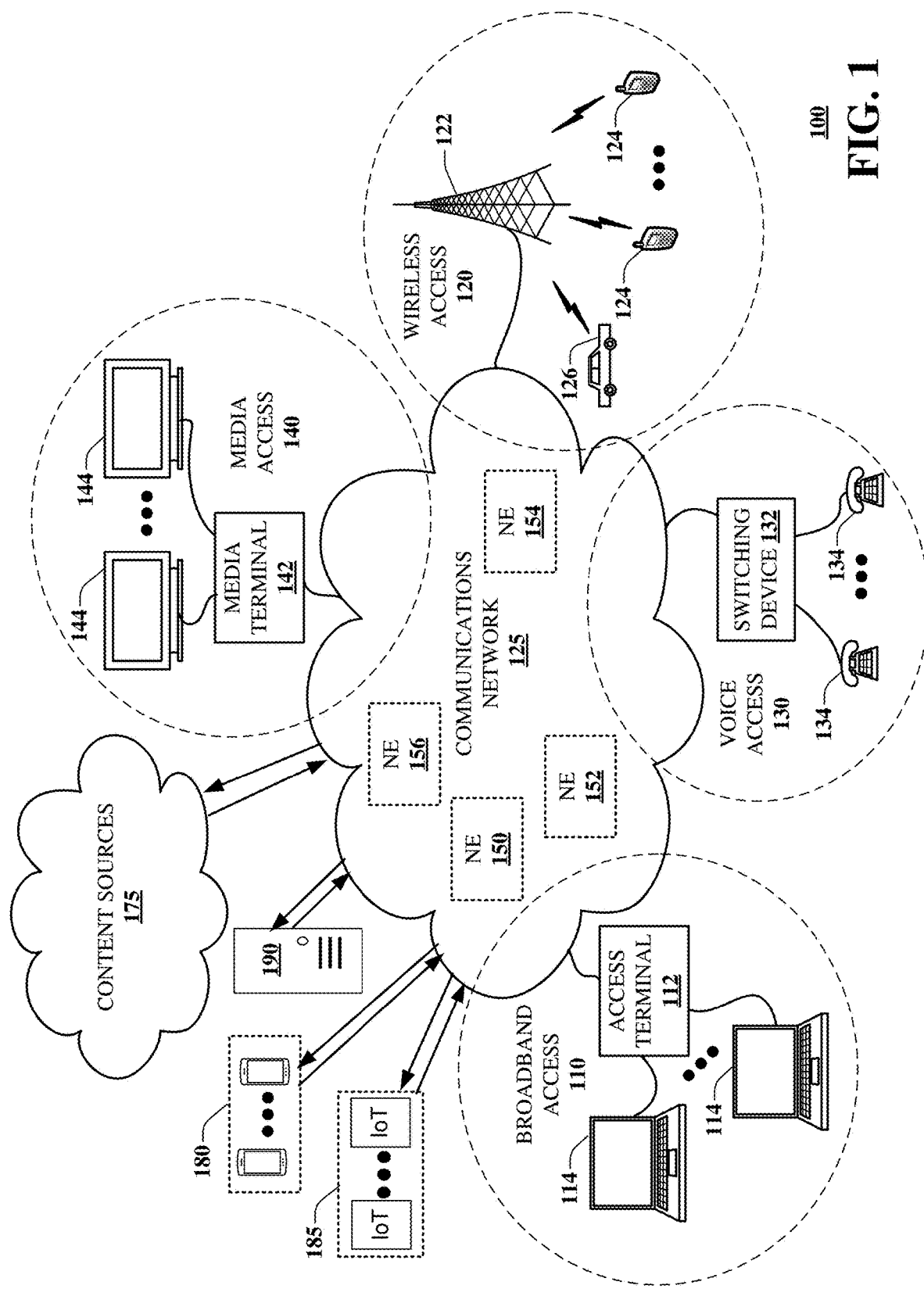
FIG. 1 is a block diagram illustrating an exemplary, non-limiting embodiment of a communications network in accordance with various aspects described herein.

The subject disclosure describes, among other things, illustrative embodiments for providing mapping (e.g., 3D mapping and/or isometric views) and real-time location services (e.g., for first responders) utilizing various captured sensor data such as geomagnetic data. In one or more embodiments, 2D and/or 3D mapping can be utilized. For example, an inventory or repository of 2D maps can be available and utilized where floors are indicated for auto-selection and viewing. In this example, as described herein, geo-magnetic locating techniques can be employed to identify the particular floor where the first responder is located and then that floor and the responder's location could be shown in a 2D map. In other embodiments, the presentation can be of a 3D map as described herein. In one or more embodiments, historical tracking (e.g., breadcrumbs, replay viewing, and so forth) of the first responders' movements (which can be determined in real-time according to the embodiments described herein which can utilize sensor data (e.g., geo-magnetic data for the Z Axis and/or other sensor data for other coordinates) collected from a sensor(s) of the first responder(s)) can be presented, recorded or otherwise indicated such as on a 2D and/or 3D map. One or more of the embodiments described herein utilize 3D mapping data and/or generate and/or present 3D maps, however, one, some or all of these embodiments can also utilize 2D mapping data and/or generate and/or present 2D maps in place of or in conjunction with 3D maps. Other embodiments are described in the subject disclosure.

One or more aspects of the subject disclosure is a method including enabling installation of a Software Development Kit (SDK) on a plurality of mobile devices resulting in a plurality of installed SDKs, where different groups of the mobile devices are managed by different entities. The method includes receiving, by a processing system over a network from the plurality of mobile devices via the plurality of installed SDKs, sensor data captured by one or more sensors of the plurality of mobile devices, the sensor data including geomagnetic data, the sensor data being captured within a plurality of buildings, where a portion of the sensor data for a same building of the plurality of buildings is captured at different times by different mobile devices of the plurality of mobile devices. The method includes providing, by the processing system over the network, the sensor data to a geomagnetic mapping server to enable generation of geomagnetic footprints for the plurality of buildings. In one or more embodiments, the SDK can also have capabilities to detect transitions between indoor and outdoor environments, and can present appropriate context (e.g., maps) automatically without user intervention. In one or more embodiment, the SDK can be provided for building Dispatcher Consoles (e.g., as browser-based application) such as on desktop PCs providing location and mapping views for incident management.

One or more aspects of the subject disclosure include a device having a processing system including a processor; and a memory that stores executable instructions that, when executed by the processing system, facilitate performance of operations. The operations include obtaining, from a mapping repository, a particular map of a particular building, where the particular map is generated and stored at the mapping repository in conjunction with a geomagnetic footprint of the particular building that is aggregated with indoor mapping data for the particular building, where the geomagnetic footprint is generated based on sensor data captured by one or more sensors of a plurality of mobile devices, the sensor data including magnetic field data previously captured within the particular building. The operations include obtaining real-time locations of first responders in the particular building, where the real-time locations are determined according to the geomagnetic footprint of the particular building and according to real-time sensor data including real-time magnetic field data captured by sensors of the first responders. The operations include presenting, on the display device, a real-time mapping of an inside of the building including the real-time locations of the first responders.

One or more aspects of the subject disclosure include a non-transitory machine-readable medium, comprising executable instructions that, when executed by a processing system including a processor, facilitate performance of operations. The operations include receiving, over a network from a plurality of mobile devices via a plurality of installed SDKs, sensor data captured by one or more sensors of the plurality of mobile devices, the sensor data including magnetic field data, the sensor data being captured within a particular building at different times by different mobile devices of the plurality of mobile devices. The operations include providing, over the network, the sensor data to a geomagnetic mapping server to enable generation of a geomagnetic footprint for the particular building that is aggregated with indoor mapping data for the particular building and stored as a geomagnetic map in a mapping repository. The operations include providing, over the network, at least a portion of data representative of the geomagnetic map of the particular building to a communication device for presentation at the communication device along with real-time locations of first responders in the particular building, where the real-time locations are determined according to real-time sensor data including real-time magnetic field data captured by sensors of the first responders.

Referring now to FIG. 1, a block diagram is shown illustrating an example, non-limiting embodiment of a system 100 in accordance with various aspects described herein. System 100 can include mobile devices, such as smart phones 180, IoT devices 185 or other mobile devices including laptops, wearable devices, and so forth. The mobile devices can communicate utilizing various wireless technologies or combinations of technologies including cellular communications, WiFi, UWB, Bluetooth®, and so forth. System 100 can also include one or more servers 190 (one of which is shown) that can operate to generate, store (e.g., in a mapping repository), update, aggregate with other data and/or maps, distribute, and/or otherwise manage inside/indoor mapping for buildings (which can include closed structures such as an apartment building or office building; open or semi-open structures such as a stadium; and combinations thereof such as a college campus having multiple buildings and outdoor areas), as well as geomagnetic footprint data for the buildings.

In one or more embodiments, system 100 can expand upon sensor fusion for providing precise indoor locations. For example, an indoor mapping SDK can auto-detect if a building, which a first responder has entered, has any available indoor mapping including 2D and/or 3D. If available, the SDK can request the available mapping to be delivered to a mobile device such as a smartphone, or if the SDK recognizes that there is no available indoor mapping, then it can automatically (or subject to user opt-in authorization) go into indoor map collection mode. By aligning the 3D (X, Y and Z-Axis) location elements with the contextual relevance of 3D indoor mapping, system 100 can leverage two (or more) technologies together allowing for a first responder network to build an aggregated 3D indoor mapping database, such as for the benefit of, or on behalf of, public safety agencies. In one embodiment, AI and/or VR could also be merged or otherwise utilized in conjunction with the SDK to overlay additional sensory data along with the 3D location and indoor mapping data, including biometric data, environmental data, object of interest data, recommendation information, first responder IDs, first responder capabilities/equipment, and so forth. In one embodiment, other data can also be utilized to facilitate 3D map generation and/or real-time location services, including barometric pressure or changes thereto (e.g., to determine or estimate elevation or elevation changes such as moving between floors), accelerometer information, and so forth. Imaging data can also be utilized to facilitate 3D map generation and/or real-time location services, such as verifying a location determination that was based on geomagnetic data by comparison to an image captured on a body camera of the first responder.

In one embodiment, an indoor mapping and 3D location SDK can provide 3D X, Y and Z-Axis location data to determine what position and floor the first responder is presently located at and to overlay that location(s) onto indoor maps, including 3D maps (which may or may not include exploded views of the inside of buildings and floors). A mapping process can be implemented for the inside of buildings from sensor data that is captured, such as based on geomagnetic footprints of the building. In one or more embodiments, the Z-axis can be determined based on a comparison of magnetic field data captured by the IoT device as compared with the geomagnetic footprint of the building while the X and Y-axis can be determined by other techniques such as location services of the IoT device (e.g., accelerometer, compass, gyroscope, or any combination thereof). In one or more embodiments, the X, Y and Z-axis can be determined based on a comparison of magnetic field data captured by the IoT device as compared with the geomagnetic footprint of the building. In this example, the X and Y-axis determination can be confirmed for accuracy by other techniques such as location services of the IoT device (e.g., sensor data from accelerometer, compass, gyroscope, or any combination thereof). In one or more embodiments, geomagnetism can be employed, which is based on the properties of Earth's magnetic fields where each building can introduce a unique distortion to that magnetic field, with its own magnetic features. In one or more embodiments, magnetic readings of the building can be matched, correlated or otherwise compared to a database of buildings which can include a magnetic map of the building, building floorplans, and so forth.

In one or more embodiments, logic and methodology can be added to the SDK to leverage location sensor fusion to determine the X, Y and Z-Axis in a building and then determine (e.g., automatically) to either serve existing maps (if they exist) and/or to (e.g., automatically) go into indoor map collection mode leveraging sensors on the mobile device(s). In one embodiment, the mobile device can be a smart phone, and the map collection mode may or may not also utilize video camera and/or Bluetooth® or other connection to a body camera so that when the first responder(s) walks through the building, the SDK(s) auto maps the indoors (whenever the first responder travels). In one or more embodiments, when overlayed onto the existing building floorplan, BIM file or CAD file, precise indoor location and indoor mapping can be collected and stored for future recall, such as based upon location data triggers. In one or more embodiments, a 3D Aware Location and Indoor Mapping SDK can be broadly distributed to many public safety focused and first responder branded mobile applications to crowd-source this map data faster. In one or more embodiments, individual map files (which may have been collected by different devices at different times utilizing different collection platforms and which may include overlapping mapped areas) can be stitched together which will allow a first responder network to build a national aggregated indoor mapping database on behalf of public safety. In one embodiment, magnetic footprint data for overlapping mapped areas (e.g., collected by different devices at different times) can be compared for accuracy and verification.

Indoor mapping has been primarily focused on a retail experience to improve shopping and inventory. Public safety often suffers from utilizing older technology. In one or more embodiments, the first responders themselves will be able to improve their efficiency and increase safety (e.g., possibly save lives of fellow first responders) by dramatically improving the contextual and sensory awareness when indoors. First responders generally want their location to be known (particularly if it could possibly save their lives), so they can be provided with the option to opt-in during their regular shift and then whenever they are dispatched to a commercial, industrial or other building or residence, the SDK would have the intelligence to determine in real-time if any previous indoor mapping exists for that particular locale. If it does, the system can serve the 3D location and 3D indoor mapping to the first responder if they are a first responder network user. If the SDK determines that no existing mapping exists, then it can automatically go into map collection mode. The SDK would use the power of crowd sourcing to scale an aggregated database of indoor mapping. This service can be beneficial to first responder network users. In one embodiment, the SDK can facilitate building the national aggregated indoor map database on behalf of public safety. The system described herein can be implemented with new technologies such as AI and virtual reality, that provide desired information to the first responders in an easily recognizable format, and which can provide other types of information such as recommendations. The aggregated indoor map database can also collect mapping data (e.g., geomagnetic readings, sensor data, images, and so forth) and/or can be utilized by other industries, such as commercial real estate companies, building insurance providers, etc.

In one or more embodiments, geomagnetic indoor mapping can deliver precise or acceptable (e.g., within a particular threshold such as 1 foot—although other thresholds can be applied) indoor X, Y and Z-Axis location, and 3D location data can be overlayed onto a 3D map (e.g., one generated by Environmental Systems Research Institute (ESRI)) to show indoor location tracking in real-time. The geomagnetic mapping can be generated in a number of ways by capturing magnetic field data, such as from a sensor of a smartphone that identifies magnetic readings throughout the building as the smartphone traverses the building (i.e., the smartphone user walks through the building) so that a magnetic footprint or landscape of the inside of the building can be generated (where the structure of the building provides a change to the Earth's magnetic field). In one or more embodiments, privacy can be maintained by providing for opt-in for mapping data collection, anonymizing collected data, and so forth.

In one or more embodiments, the collection of geomagnetic data and/or other sensor data that is utilized in generating the 3D maps of the inside of the buildings can be performed by other devices and/or techniques, including autonomous devices, such as robots. As an example, an autonomous robot (e.g., utilizing Lidar or other ranging technology) can be utilized which is equipped with various sensors for capturing data, including geomagnetic data that allows for generating a magnetic footprint of the inside of the building. In one embodiment, crowd-sourcing of smart phones (or other mobile devices) equipped with sensors of first responders can be utilized in conjunction with autonomous robots, such as sending the autonomous robots into buildings where there is a lack of data (or the geomagnetic mapping is not complete for the building)

For example, system 100 can facilitate in whole or in part enabling installation of an SDK on a plurality of mobile devices resulting in a plurality of installed SDKs, where different groups of the mobile devices are managed by different entities; receiving, over a network from the plurality of mobile devices via the plurality of installed SDKs, sensor data captured by one or more sensors of the plurality of mobile devices, the sensor data including magnetic field data, where the sensor data is captured within a particular building at different times by different mobile devices of the plurality of mobile devices; providing, over the network, the sensor data to a geomagnetic mapping server to enable generation of a geomagnetic footprint for the particular building that is aggregated with indoor mapping data for the particular building and stored as a map in a 3D mapping repository; and providing, over the network, the map of the particular building to a communication device(s) (e.g., a laptop, tablet, vehicle communication system, smart phone, etc.) for presentation at the communication device along with real-time locations of first responders in the particular building, where the real-time locations are determined according to real-time sensor data including real-time magnetic field data captured by sensors of the first responders.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideBand network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
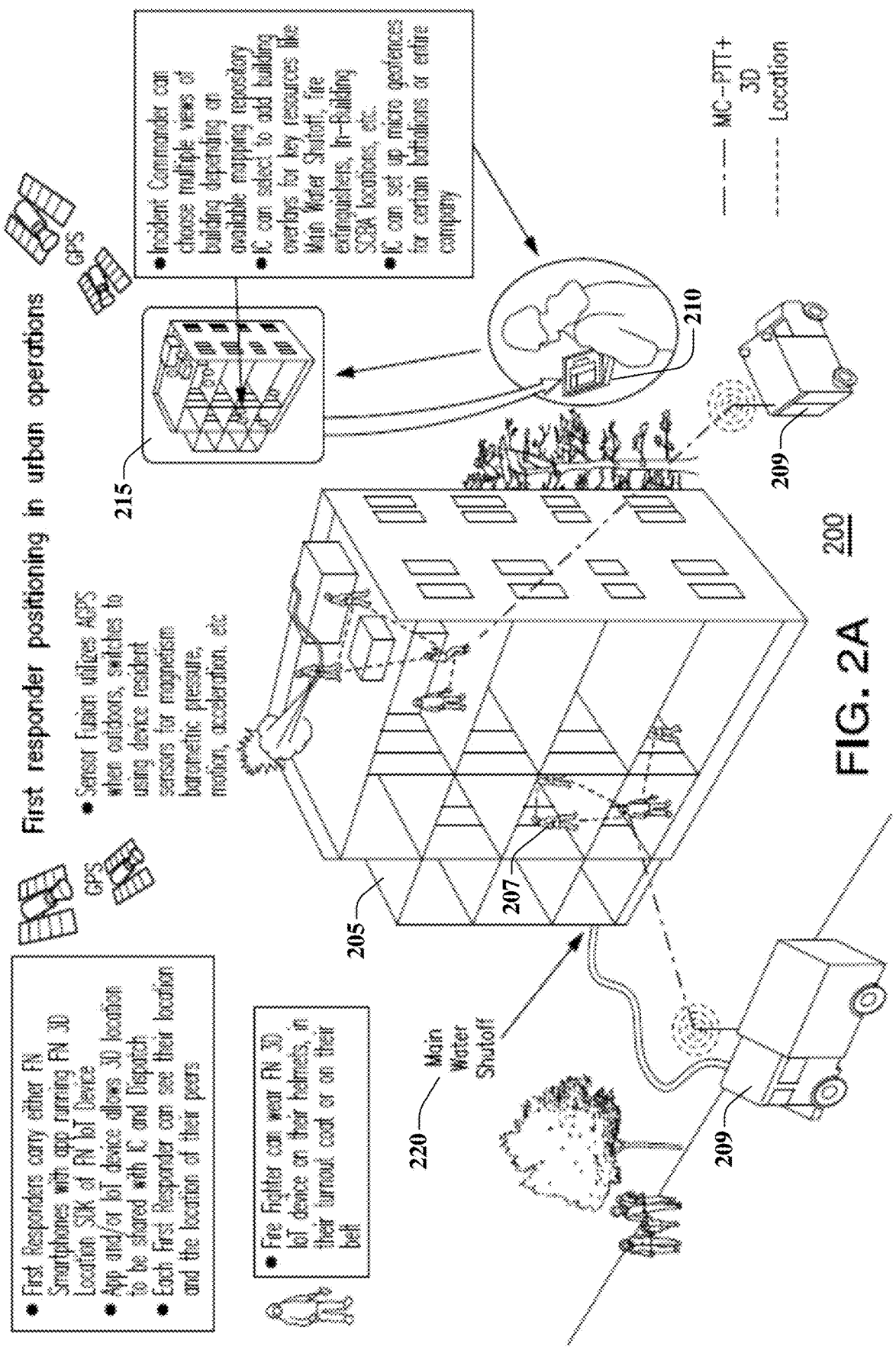

FIG. 2A is a block diagram illustrating an example, non-limiting embodiment of a system 200 functioning within the communication network of FIG. 1 in accordance with various aspects described herein. System 200 provides for 3D mapping and real-time location services for first responder(s) inside of the building 205.

In one embodiment, system 200 can provide sensor fusion that utilizes AGPS when outdoors, and switches to geomagnetism and Z-Axis data when indoors. In one embodiment, first responders 207 (several of which are illustrated) can carry smartphones (e.g., first responder network capable devices) with app running a 3D Location SDK and/or can carry/wear/equipped with an IoT Device. In one embodiment, the App and/or IoT device allows 3D location to be shared with other devices 210 such as of an incident commander and/or dispatch, and/or with emergency vehicles 209 (e.g., communication systems of the emergency vehicles). In one embodiment, some or all of the first responders or other users can see their location and the location of their peers.

In one embodiment, firefighters or other helmeted first responders can wear a 3D IoT device on their helmet, although other wearable devices can be utilized including in their turnout coat or on their belt or otherwise be worn. In one embodiment, an incident commander can choose multiple views 215 of the building 205 depending on available mapping repository. In one embodiment, the incident commander can select to add building overlays 220 for key resources like main water shutoff, fire extinguishers, in-building self-contained breathing apparatus or SCBA locations, etc. In one embodiment, the incident commander can set up micro geofences (see e.g., FIG. 2B) for certain battalions or entire company or other categories and groupings of first responders. In one embodiment, the geofences can be of various shapes including 3D spheres, cubes, rectangular boxes, and so forth. In one or more embodiments, 3D geofencing can be implemented that can cover multiple floors or other vertical space which can be a benefit over 2D geofencing. In one embodiment, the geofences can surround only a portion of a building, such as a single floor. In one embodiment, multiple geofences can be generated for a building.

In one embodiment, encapsulation of a Z-Axis SDK into a geomagnetic data collection can be done. In one embodiment, Height above Ellipsoid (HaE) or Height above Terrain (HaT) data can be converted to floor level. In one embodiment, the need for end user device calibration can be eliminated. In one embodiment, 3D location coverage footprint can be extended across entire first responder network service footprint. In one embodiment, server-side and/or mobile-side event triggers can be provided based upon enter/exit/dwell events/"Fast-Fall" changes in Z-Axis (e.g., a rapid movement between floors which would likely represent falling through an opening or a hole), etc. In one embodiment, a 3D Location SDK can also incorporate sensor fusion map intelligence.

In one embodiment, geofencing is provided. This can include enabling radial, spherical, rectangular or other shaped geofences around a specific point, building(s), floor, range of floors, and so forth. In one embodiment, user-based geofences (e.g., around talk group or individual user) can be implemented. In one embodiment, API queries can be enabled so as to retrieve or otherwise communicate with users in a particular geofence. In one embodiment, the geofences can be used to trigger alerts, such as for fast-fall changes in the Z-Axis.

In one embodiment, map data injection can be performed. For example, indoor map data can be fed to a mapping generator (e.g., ESRI) and an aggregated map eco-system can be built with API ties into multiple providers. In one embodiment, the system provides the ability to ingest building floorplans, building CAD data and then deliver, storage and retrieval of building floorplans. In one embodiment, the system can present floorplans and indoor building maps to visualization layer through API in an image format. In one embodiment, the system can leverage combined Z-Axis data with floor level 3D location visualized on various map providers. In one embodiment, the system can obtain indoor maps in pre-mapped buildings. In one embodiment, the system provides indoor map aggregation APIs for use with and by multiple vendors. In one embodiment, the system provides a platform with a single source for obtaining aggregated indoor map data.

In one embodiment, IoT devices can be utilized to derive Z-Axis from streaming sensor data. In one embodiment, the system can fulfill firefighter needs for non-smartphone/true IoT device's for implementing real-time location services. In one embodiment, the system can wirelessly deliver health diagnostic information in real-time (e.g., via Bluetooth) such as through use of a heart rate monitor, fitbit, smart watch, etc.

In one embodiment, integration, API, and portals can be provided. For example, a portal view of live monitoring of end users (e.g., first responders 207), incidents, geofences and talk groups can be provided. In one embodiment, incident commander and dispatch options can be provided to see 3D building's with "pull-apart" elevator floor view. As another example, API integration of some, most or all location platform functionality can be provided. As another example, the system can support MCPTT integration and future iterations of this technology.

In one embodiment, the system and methodology provide for scaling the aggregated indoor map repository. For example, the methodology can leverage a crowd sourced 3D Location SDK (operating and installed on mobile devices that utilize a first responder network such as FirstNet) that collects indoor map data (e.g., geomagnetic data) during everyday (e.g., routine or non-emergency) first responder activities.

In one embodiment, first responder Opt-In permission can be required, and/or can only track/map during an active shift. In one embodiment, the methodology can be leveraged across an entire first responder network app ecosystem.

In one embodiment, the crowd sourcing methodology can be extended to other industries such as security firms to actively capture indoor mapping such as during regular "building walks." In one embodiment, the system can leverage smartphone-based video mapping to simplify collection of indoor map data. In one embodiment, the methodology can include working in conjunction with existing in-market deployed body cameras to bring Z-Axis location and indoor map capabilities.

In one embodiment, the 3D Location SDK can also incorporate sensor fusion map intelligence so that various sensor data can be collected and utilized, such as magnetic field measurement, barometric pressure, and so forth. In one embodiment, auto recognition of the incident location is provided. If building maps already exist, maps can then be delivered including to a communication device that will be presenting real-time location services. If no indoor building maps exist, the SDK can automatically go into map collection mode leveraging smartphone sensors (e.g., accelerometer, magnetometer, compass, gyroscope, etc.).

In one embodiment, the location SDK can operate on a particular platform, but the system can be utilized with various 3D indoor map platforms that are managed by various providers so that functionality described herein can be utilized as a distribution vehicle for those providers. In one embodiment, the methodology can aggregate and leverage some, most or all possible sources of indoor mapping for public safety.

In one or more embodiments, IoT devices (e.g., devices 185 from FIG. 1) can be utilized that have sensors defined by the first responder network to create particular devices for the type of first responders such as firefighters. In one embodiment, the IoT devices can have a group of sensors which are selectively employed or turned on to gather particular data for generating the 3D maps described herein. In one embodiment, the IoT devices can stream X, Y location and sensor data to a server which then adds the Z-Axis for 3D location, thus delivering a 3D Indoor Location solution for IoT devices that support the required sensors. In one embodiment, the 3D location of the first responders can be performed without utilizing or without needing to utilize access points (e.g., WiFi access points) or other fixed wireless devices in the building. In one or more embodiments, the IoT sensors can include one, some or all of an accelerometer, a magnetometer, a compass, a gyroscope, a camera, humidity detector, temperature detector, light detector, or any combination thereof. In one or more embodiments, the IoT devices can include expansion slots for the addition of other sensors of other types. In one or more embodiments, the IoT devices include rechargeable batteries. In one or more embodiments, the IoT devices can operate at or transmit/receive at various frequency bands including 2.4 and 12. In one or more embodiments, the IoT devices can include hardwire and/or wireless interfaces for bi-directional communications including transmitting of sensor data therefrom and/or receiving provisioning instructions including parameters for collecting particular sensor data. In one or more embodiments, the IoT devices include location hardware and/or software such as GPS, Cloud Location over Cellular, or other technology.

In one embodiment, a GUI provided by the system described herein can utilize various building level and indoor location indicators. In one embodiment, the geofencing is 2D or 3D. In one embodiment, group management is provided. For example, the system can support classification of users belonging to groups and sub-groups, and APIs can target a particular group or sub-group. In one embodiment, indoor map data can be fed to a mapping eco-system (e.g., ESRI) through a GeoEvent Server.

In one embodiment, centralized consent collection can be employed. In one embodiment, HALO integration can be implemented and can provide for single sign on (SSO). In one embodiment, the system can include or otherwise be connected with a billing server or system, such as a billing system of a communication service provider. In one embodiment, a separate and dedicated cloud infrastructure can be utilized for the system, including for a first responder network. In one embodiment, mapped buildings can be added to show combined location accuracy in mapped buildings. In one embodiment, location platform analytics can be incorporated into the system to report on overall location accuracy by market, by app, dynamically counting number of complete buildings mapped, etc.

FIG. 2B illustrates an example, non-limiting embodiment of a GUI 250 functioning within the communication network of FIG. 1 in accordance with various aspects described herein. GUI 250 can be generated and presented at a display device in order to show 3D mapping and real-time location services for first responder(s) inside of the building. The presentation of the 3D map and the real-time location of the first responders can be according to one or more of the processes described herein including serving a 3D map and overlaying icons according to real-time location techniques which utilize geomagnetic sensor data captured by an IoT device of the particular first responder compared with an already generated geomagnetic footprint of the building (e.g., to determine at least the Z axis real-time location of the first responder). As described herein, various sensor data can be utilized, including other sensor data to determine or verify the X and Y axis real-time location for the first responder. In one or more embodiments, the location accuracy can depend on a number of factors. In one or more embodiments, an accuracy range or threshold may be utilized of at or below 6 feet for X, Y Axis and/or at or below 3 m accuracy for Z-Axis.

GUI 250 illustrates an exploded view of floors, which can be a selectable option for a viewer. In this example, all floors (two) of a building 255 are shown, however, the viewer can zoom in and manipulate the presentation as desired, such as showing only a portion of the inside of the building. The GUI 250 can show the building 255 and/or the exploded views of the floor(s), which in one or more embodiments can be selectable or adjustable. The particular communication device(s) presenting GUI 250 can vary and can be in the possession of various individuals including the incident commander, one or more of the first responders, emergency vehicles, dispatch and so forth. In one embodiment, GUI 250 can be adjustable as to orientation, zoom, and so forth. In one embodiment, different icons (e.g., different colors, shapes, text identification) can be utilized for different objects and/or different first responders. In another embodiment, different icons can be utilized to group first responders, such as by capabilities, equipment, battalion, fire truck, and so forth. Continuing with this example, the different icons representative of different groupings can include text identifications so that first responders within a particular grouping (e.g., illustrated by same icon) can be distinguished.

In one embodiment, the GUI 250 can be adjusted by the viewer to show a particular level of detail of the indoor mapping, such as showing only structure or showing objects 257 (actual or estimated to be present (e.g., desks in cubicles believed to be present). In one embodiment, the icons representative of the first responders can be oversized compared to the structure of the building to facilitate viewing or can be actual proportionally sized with respect to the walls/floors/doors/etc. In one embodiment, a history of movement can be stored, recorded and/or presented at the GUI 250. For example, a color-coded path 265 that has been travelled by each first responder can be shown in the GUI 250. This can facilitate knowing whether the first responders have checked various locations throughout the building. In other embodiments, the history of movement and/or other collected data from the first responders can be utilized in a post-forensic data analysis of the building and/or the particular incident.

In one embodiment, a geofence 260 can be generated or otherwise positioned. For example, the geofence 260 can surround a particular floor of the building 255 so that an alert is generated if one or more of the first responders enters and/or exits that floor. The selection or generation of the geofence 260 at the GUI 250 can be done in a number of different ways including drag and drop methods, adjusting size, adjusting orientation, selecting a shape, and so forth. In one embodiment where the GUI 250 is being presented at multiple communication devices, the geofence 260 and/or the alerts triggered therefrom can be particular to the communication device that generated it or can be shared with the other communication devices. In one embodiment, the alerts can be of various formats including visual and/or audio alerts, and can be distributed to various devices including first responder devices or other devices that may or may not be presenting GUI 250, such as providing an alert to a first responder (e.g., via audio/radio) to indicate that another first responder has entered the particular floor even though neither of the first responders are viewing the GUI 250.

Figure 2C:
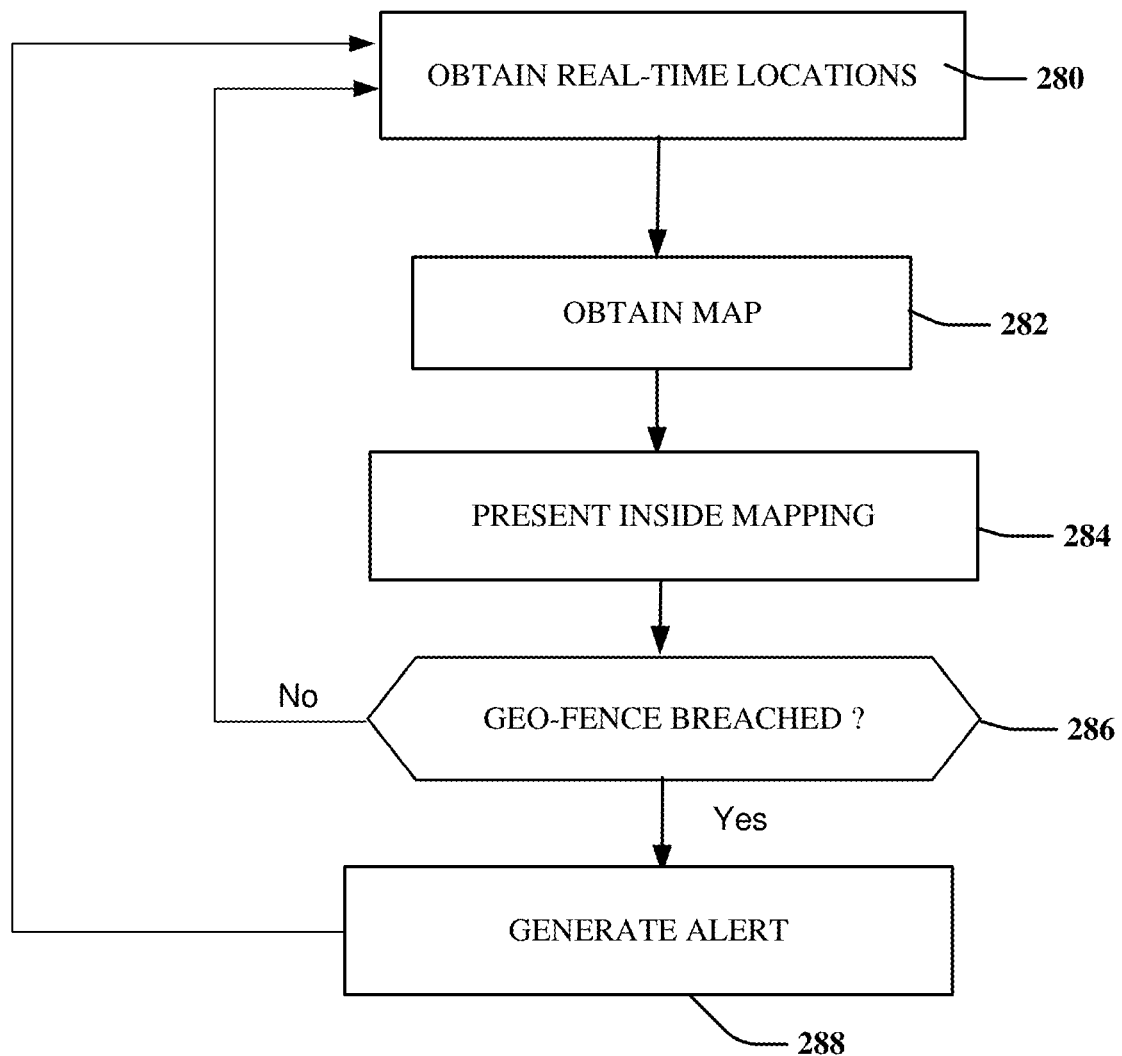
FIG. 2C depicts an illustrative embodiment of a method in accordance with various aspects described herein.

FIG. 2C depicts an illustrative embodiment of a method 275 in accordance with various aspects described herein. Method 275 can be performed by various devices or combinations of devices including end user devices at or near a building, vehicle communication systems, servers, and so forth At 280, real-time locations of first responders in the particular building can be obtained over a network. At 282, a particular map of a particular building can be obtained, such as from a 3D mapping repository. In one embodiment, the particular map can be generated and stored at the 3D mapping repository and can include or can be associated with a geomagnetic footprint of the particular building that can be aggregated with indoor mapping data for the particular building (e.g., a geomagnetic map). As another example, the geomagnetic footprint can be generated based on sensor data captured by one or more sensors of a plurality of mobile devices, where the sensor data includes magnetic field data previously captured within the particular building. In one embodiment, the real-time locations can be determined according to real-time sensor data including real-time magnetic field data captured by sensors of the first responders which are then compared to the magnetic footprint and/or 3D mapping of the building to determine a location in the building. In one embodiment, various other sensor data can also be utilized to facilitate the real-time location determination including with respect to determining the X and Y axis location. At 284, a real-time 3D mapping of an inside of the building can be presented on a display device. For example, the real-time locations of the first responders can be depicted in the 3D mapping. At 286, a 3D geofence can be generated and monitored for a portion of the particular building. At 288, an alert can be generated responsive to a determination that one of the first responders has traversed the 3D geofence according to the real-time locations. For example, the alert can signal to an incident commander that a first responder has entered or left a particular floor. In another embodiment, the alert can be a fast-fall alert indicating that the first responder may have fallen through an opening. In one embodiment, the fast fall alert can be generated based on motion data associated with the IoT sensor such as a speed of going between floors being over a particular threshold which would be indicative of a fast fall.

In one embodiment where no geomagnetic map for a building has been built, the IoT devices can coordinate amongst each other for generating a map while also providing real-time location services. For example, a first IoT device travelling down a hallway can capture magnetic field data and/or other sensor data for the hallway which is then utilized in conjunction with geomagnetic data and/or other sensor data captured by a second IoT device to provide a real-time location of the second IoT device in the hallway. This example can include situations where first responders are responding to an incident in the building, such as emergency or non-emergency situations.

In one embodiment, a recommendation engine can be provided for navigation of a mobile device (e.g., smartphone and/or IoT device) for completing geomagnetic mapping of a building, such as indicating to a first responder that is capturing geomagnetic that such data needs to be collected for a top floor of a building so as to complete the building's magnetic footprint.

In one or more embodiments, various devices can perform one or more of the functions described herein including determining real-time location coordinates (X, Y and/or Z axis) for each of the first responders. For example, a server can receive X and Y axis coordinates of a first responder (determined from sensor data by an IoT device which may not utilize geomagnetic techniques) and can also receive geomagnetic sensor data for that first responder. In this example, the X, Y and Z coordinates can then be calculated and streamed back to a presentation device so that an icon representative of the real-time location of that first responder can be overlayed on a 3D map of the inside of the building (which may have been generated according to floor plans or other information associated with the building). Continuing with this example, the server can determine the Z axis based on an analysis of the captured geomagnetic data as compared to the geomagnetic footprint of the building (which may be done in conjunction with the X and Y coordinates that have been streamed). In another embodiment, the geomagnetic analysis can be performed by a local device (e.g., the device presenting the GUI 250, 290) that receives the geomagnetic sensor data from the IoT device (e.g., along with the X and Y coordinates or sensor data representative thereof) of the particular first responder. In one embodiment, an IoT device(s) of a first responder(s) can send X, Y and Z-Axis location data to a smartphone, tablet or other mobile device and/or over the Internet to an incident commander portal, dispatcher's portal or other portal.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
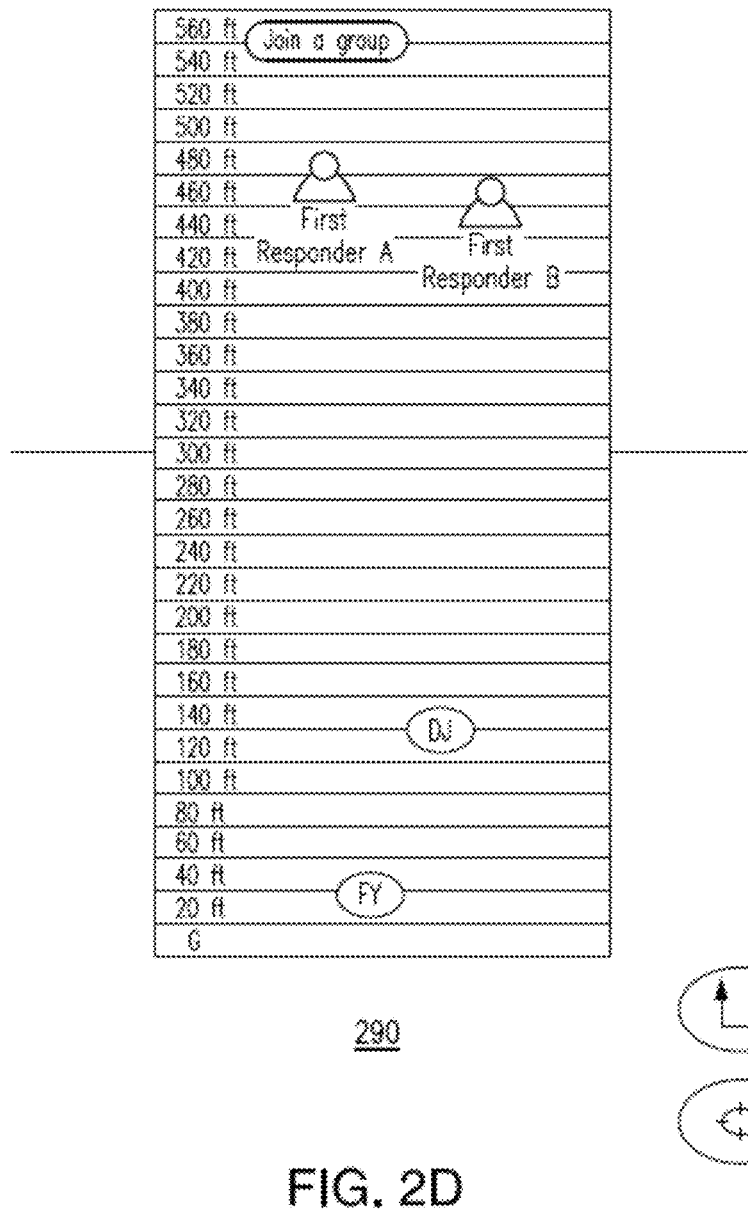

FIG. 2D illustrates an example, non-limiting embodiment of a GUI 290 functioning within the communication network of FIG. 1 in accordance with various aspects described herein. GUI 290 can be generated and presented at a display device in order to show 3D mapping and real-time location services for first responder(s) inside of the building. In this example, a simplified building map is shown which is limited to floor levels and further illustrates the real-time locations of first responder A and first responder B (on different floors). Various information for each first responder can be presented in the GUI 290, including identifications, capabilities, equipment, biometrics, path travelled (e.g., a line representing path taken since the first responder entered the building), floors visited, and so forth. In one embodiment, the simplified building map can be an option selected by the viewer and other options can be available such as more detailed mapping showing other structures (doors, windows, stairwells, and so forth). In another embodiment, other objects can be included in the GUI 290 such as objects of interest (e.g., first hoses or extinguishers) known to be present and/or other objects estimated or predicted to be present (e.g., desks in an office cubicle, table in a lunch room, and so forth). In other embodiments, the GUI 290 can present the measurement units in floors, feet, HAT, meters, and so forth.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, method 275 and user interfaces 250, 290 presented in FIGS. 1, 2A, 2B, 2C, 2D and 3. For example, virtualized communication network 300 can facilitate in whole or in part enabling installation of an SDK on a plurality of mobile devices resulting in a plurality of installed SDKs, where different groups of the mobile devices are managed by different entities; receiving, over a network from the plurality of mobile devices via the plurality of installed SDKs, sensor data captured by one or more sensors of the plurality of mobile devices, the sensor data including magnetic field data, where the sensor data is captured within a particular building at different times by different mobile devices of the plurality of mobile devices; providing, over the network, the sensor data to a geomagnetic mapping server to enable generation of a geomagnetic footprint for the particular building that is aggregated with indoor mapping data for the particular building and stored as a map in a 3D mapping repository; and providing, over the network, the map of the particular building to a communication device(s) (e.g., a laptop, tablet, vehicle communication system, smart phone, etc) for presentation at the communication device along with real-time locations of first responders in the particular building, where the real-time locations are determined according to real-time sensor data including real-time magnetic field data captured by sensors of the first responders.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
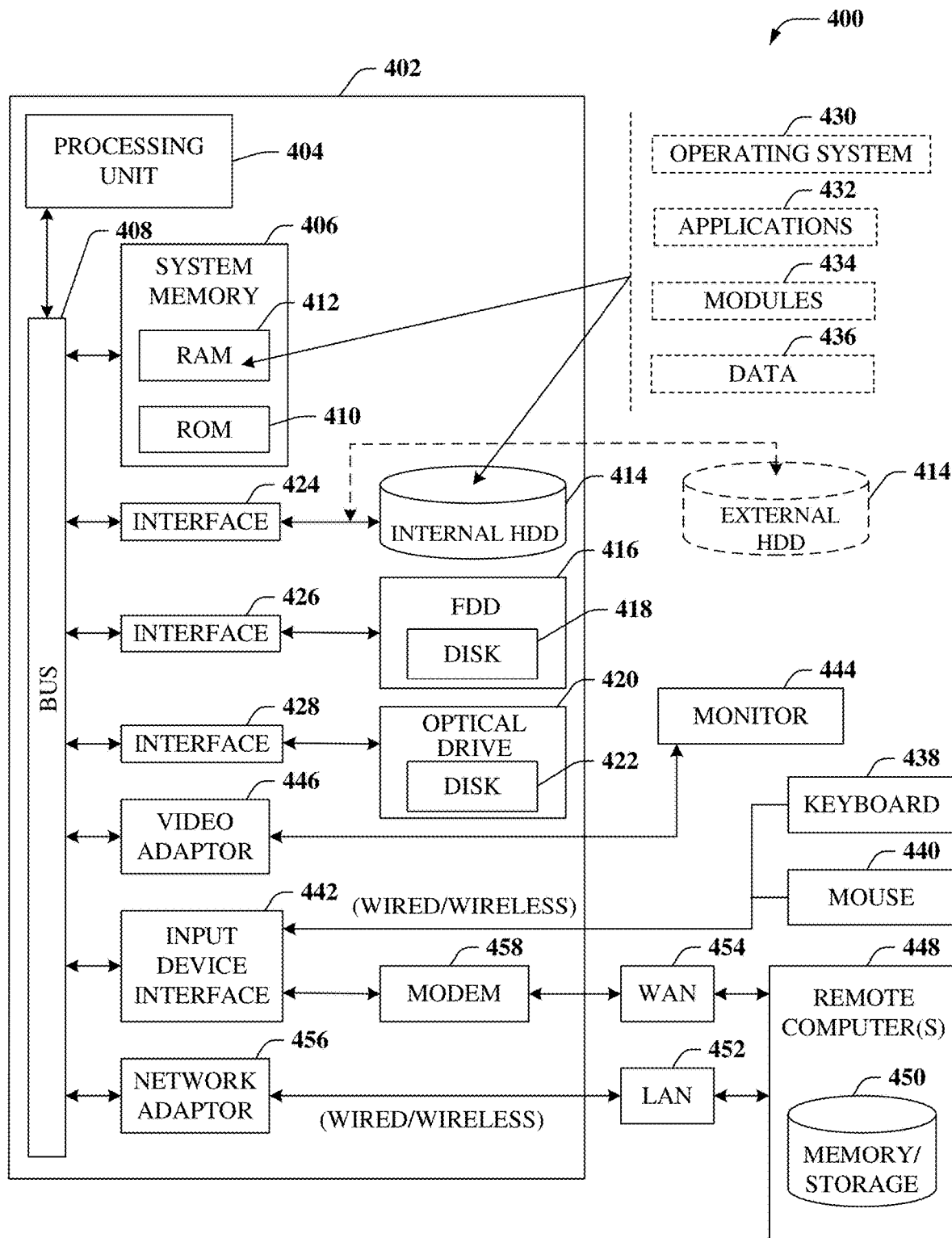
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part enabling installation of an SDK on a plurality of mobile devices resulting in a plurality of installed SDKs, where different groups of the mobile devices are managed by different entities; receiving, over a network from the plurality of mobile devices via the plurality of installed SDKs, sensor data captured by one or more sensors of the plurality of mobile devices, the sensor data including magnetic field data, where the sensor data is captured within a particular building at different times by different mobile devices of the plurality of mobile devices; providing, over the network, the sensor data to a geomagnetic mapping server to enable generation of a geomagnetic footprint for the particular building that is aggregated with indoor mapping data for the particular building and stored as a map in a 3D mapping repository; and providing, over the network, the map of the particular building to a communication device(s) (e.g., a laptop, tablet, vehicle communication system, smart phone, etc) for presentation at the communication device along with real-time locations of first responders in the particular building, where the real-time locations are determined according to real-time sensor data including real-time magnetic field data captured by sensors of the first responders.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
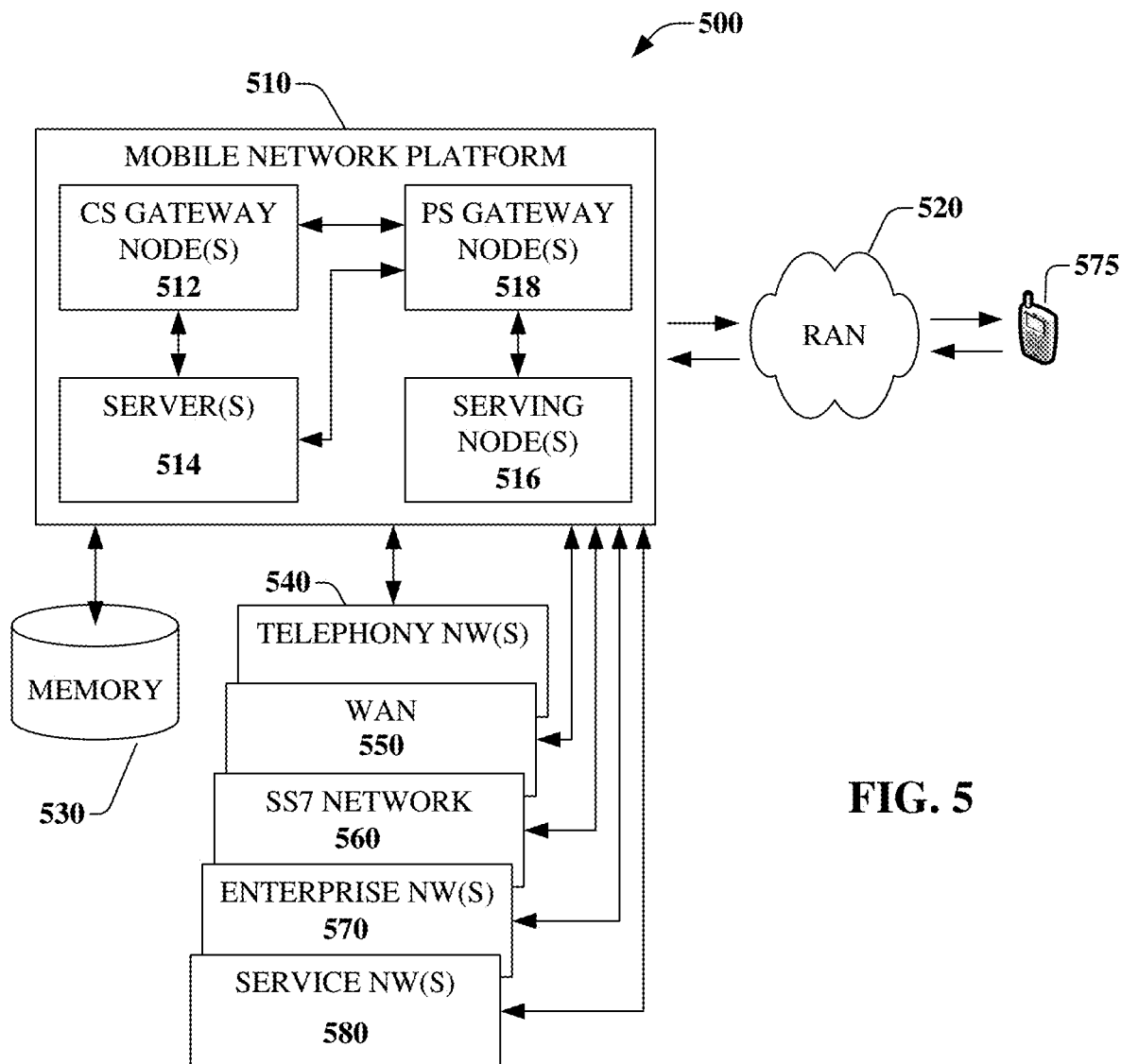
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part enabling installation of an SDK on a plurality of mobile devices resulting in a plurality of installed SDKs, where different groups of the mobile devices are managed by different entities; receiving, over a network from the plurality of mobile devices via the plurality of installed SDKs, sensor data captured by one or more sensors of the plurality of mobile devices, the sensor data including magnetic field data, where the sensor data is captured within a particular building at different times by different mobile devices of the plurality of mobile devices; providing, over the network, the sensor data to a geomagnetic mapping server to enable generation of a geomagnetic footprint for the particular building that is aggregated with indoor mapping data for the particular building and stored as a map in a 3D mapping repository; and providing, over the network, the map of the particular building to a communication device(s) (e.g., a laptop, tablet, vehicle communication system, smart phone, etc) for presentation at the communication device along with real-time locations of first responders in the particular building, where the real-time locations are determined according to real-time sensor data including real-time magnetic field data captured by sensors of the first responders.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
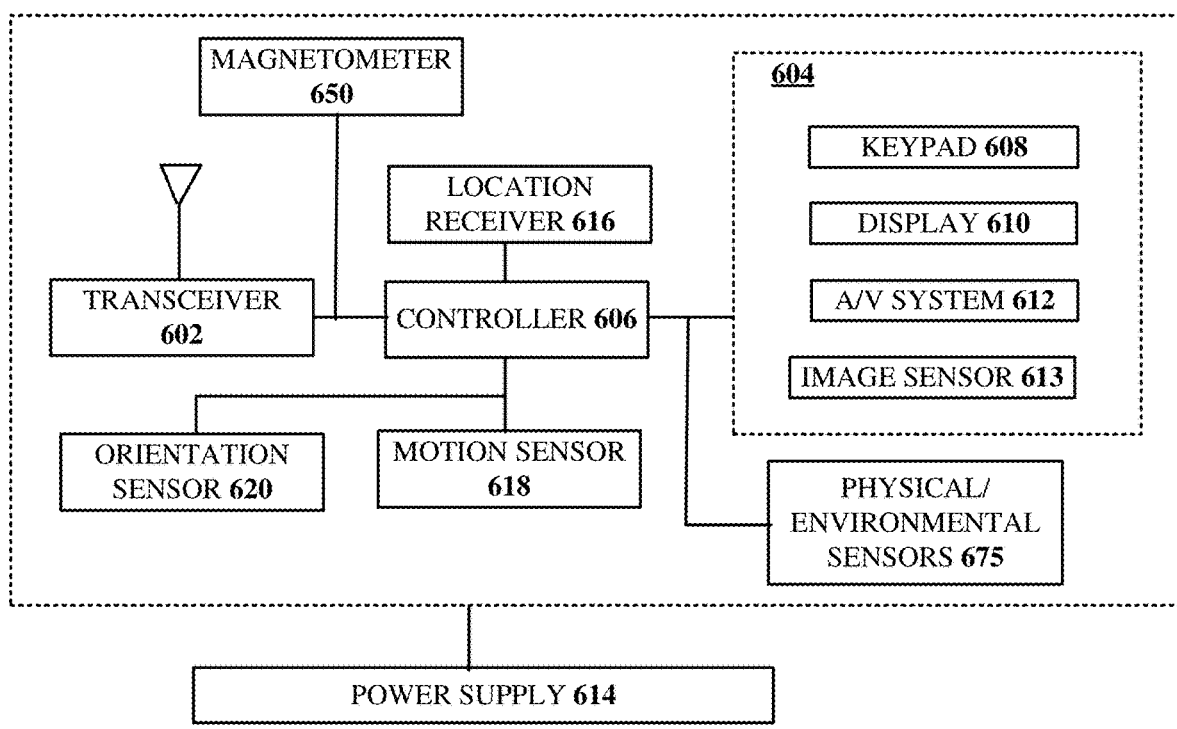
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144, mobile devices 180, IoT devices 185 or other client devices for communication via either communications network 125. It should be further understood that different embodiments of the communication device 600 may or may not include the various components, circuits or hardware described below. For example, computing device 600 can facilitate in whole or in part enabling installation of an SDK on a plurality of mobile devices resulting in a plurality of installed SDKs, where different groups of the mobile devices are managed by different entities; receiving, over a network from the plurality of mobile devices via the plurality of installed SDKs, sensor data captured by one or more sensors (e.g., magnetometer 650 measuring magnetic fields and variations thereof) of the plurality of mobile devices, the sensor data including magnetic field data, where the sensor data is captured within a particular building at different times by different mobile devices of the plurality of mobile devices; providing, over the network, the sensor data to a geomagnetic mapping server to enable generation of a geomagnetic footprint for the particular building that is aggregated with indoor mapping data for the particular building and stored as a map in a 3D mapping repository; and providing, over the network, the map of the particular building to a communication device(s) (e.g., a laptop, tablet, vehicle communication system, smart phone, etc) for presentation at the communication device along with real-time locations of first responders in the particular building, where the real-time locations are determined according to real-time sensor data including real-time magnetic field data captured by sensors of the first responders. In one or more embodiments, the communication device 600 can include one or more physical/environmental sensors 675 for detecting and sensing various sensor data. As an example, the sensor(s) 675 can be specialized sensors that measure and transmit physical and/or environmental conditions. In one or more embodiments, these sensors can be in addition to or in place of the magnetometer 650, the orientation sensor 620, the motion sensor 618, and/or the image sensor 613.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology. In one embodiment, the orientation sensor can be or can include or otherwise be used in conjunction with a magnetometer (e.g., the magnetometer 650) as a primary sensor for measuring magnetic fields and/or to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. In one or more embodiments, augmented reality and/or virtual reality can be leveraged by system and functions described herein by combining those feeds with the 3D location and Indoor Mapping feeds. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:
enabling installation of a Software Development Kit (SDK) on a plurality of mobile devices resulting in a plurality of installed SDKs, wherein different groups of the mobile devices are managed by different entities;
receiving, by a processing system over a network from the plurality of mobile devices via the plurality of installed SDKs, sensor data captured by one or more sensors of the plurality of mobile devices, the sensor data including geomagnetic data, the sensor data being captured within a plurality of buildings, wherein a portion of the sensor data for a same building of the plurality of buildings is captured at different times by different mobile devices of the plurality of mobile devices; and
providing, by the processing system over the network, the sensor data to a geomagnetic mapping server to enable generation of geomagnetic footprints for the plurality of buildings, wherein a particular map of a particular building of the plurality of buildings is provided from a mapping repository to a communication device for presentation at the communication device and is overlayed with real-time locations of first responders in the particular building, wherein the real-time locations are determined according to a geomagnetic footprint of the particular building and according to real-time sensor data including real-time geomagnetic data captured by sensors of the first responders, wherein a first path traveled by a first first responder of the first responders in the particular building is represented in the presentation, and wherein a second path traveled by a second first responder of the first responders in the particular building is represented in the presentation, the second path being different from the first path.

2. The method of claim 1, further comprising receiving, by the processing system over the network from the plurality of mobile devices via the plurality of installed SDKs, X and Y coordinates corresponding to the sensor data captured by the one or more sensors of the plurality of mobile devices.

3. The method of claim 2, wherein the receiving the sensor data is responsive to determinations by the plurality of installed SDKs that a completed indoor map is not stored in a mapping repository for a corresponding one of the plurality of buildings and further comprising:
facilitating building and managing the mapping repository that integrates multiple map data sources, aggregates mapping data, normalizes the mapping data, and provides APIs for access to the mapping data.

4. The method of claim 1, wherein the plurality of mobile devices comprises smart phones, IoT devices, or a combination thereof, wherein the geomagnetic footprints for the plurality of buildings are aggregated with indoor mapping data for the plurality of buildings and stored in a mapping repository that includes 2D maps, 3D maps or a combination thereof.

5. The method of claim 1, wherein the different entities comprise different first responder agencies.

6. The method of claim 1, wherein first and second mobile devices of the different mobile devices that capture the portion of the sensor data for the same building at the different times are managed by first and second entities, respectively, of the different entities.

7. The method of claim 6, wherein the capture of the portion of the sensor data for the same building at the different times by the first and second mobile devices is responsive to user inputs to opt-in to data collection at the first and second mobile devices.

8. The method of claim 1, wherein the one or more sensors include an accelerometer, a magnetometer, a compass, a gyroscope, a camera or any combination thereof.

9. The method of claim 1, wherein geomagnetic maps, real-time locations of first responders in a particular building, or a combination thereof are configured for use with different mapping platforms of communication devices, wherein the real-time locations are determined according to real-time sensor data including real-time geomagnetic data captured by sensors of the first responders.

10. A non-transitory machine-readable medium, comprising executable instructions that, when executed by a processing system including a processor, facilitate performance of operations, the operations comprising:
receiving, over a network from a plurality of mobile devices via a plurality of installed Software Development Kit (SDKs), sensor data captured by one or more sensors of the plurality of mobile devices, the sensor data including magnetic field data, the sensor data being captured within a particular building of a plurality of buildings at different times by different mobile devices of the plurality of mobile devices;
providing, over the network, the sensor data to a geomagnetic mapping server to enable generation of a geomagnetic footprint for the particular building that is aggregated with indoor mapping data for the particular building and stored as a geomagnetic map in a mapping repository; and
providing, over the network, at least a portion of data representative of the geomagnetic map of the particular building to a communication device for presentation at the communication device along with real-time locations of first responders in the particular building, wherein the real-time locations are determined according to a geomagnetic footprint of the particular building and according to real-time sensor data including real-time magnetic field data captured by sensors of the first responders,
wherein a particular map of the particular building is provided from a mapping repository to the communication device for the presentation at the communication device,
wherein a first path traveled by a first first responder of the first responders in the particular building is represented in the presentation, and wherein a second path traveled by a second first responder of the first responders in the particular building is represented in the presentation, the second path being different from the first path.

11. The non-transitory machine-readable medium of claim 10, wherein the plurality of mobile devices comprises smart phones, IoT devices, or a combination thereof, and wherein the mapping repository includes 2D maps, 3D maps or a combination thereof.

12. The non-transitory machine-readable medium of claim 10, wherein different groups of the plurality of mobile devices are managed by different entities, wherein the different entities comprise different first responder agencies, and wherein the one or more sensors include an accelerometer, a magnetometer, a compass, a gyroscope, and a camera.

13. A method comprising:
receiving, by a processing system over a network from a plurality of mobile devices via a plurality of installed Software Development Kits (SDKs), sensor data captured by one or more sensors of the plurality of mobile devices, the sensor data including geomagnetic data, the sensor data being captured within a plurality of buildings, wherein a portion of the sensor data for a same building of the plurality of buildings is captured at different times by different mobile devices of the plurality of mobile devices;
providing, by the processing system over the network, the sensor data to a geomagnetic mapping server to enable generation of geomagnetic footprints for the plurality of buildings; and receiving, by the processing system over the network from the plurality of mobile devices via the plurality of installed SDKs, coordinates corresponding to the sensor data captured by the one or more sensors of the plurality of mobile devices,
wherein a particular map of a particular building is provided from a mapping repository to a communication device for presentation at the communication device and is overlayed with real-time locations of first responders in the particular building,
wherein the real-time locations are determined according to a geomagnetic footprint of the particular building and according to real-time sensor data including real-time geomagnetic data captured by sensors of the first responders,
wherein a first path traveled by a first first responder of the first responders in the particular building is represented in the presentation, and wherein a second path traveled by a second first responder of the first responders in the particular building is represented in the presentation, the second path being different from the first path.

14. The method of claim 13, further comprising facilitating building and managing the mapping repository that integrates multiple map data sources, aggregates mapping data, normalizes the mapping data, and provides APIs for access to the mapping data.

15. The method of claim 13, wherein the plurality of mobile devices comprises smart phones, IoT devices, or a combination thereof, and wherein the mapping repository includes 2D maps, 3D maps or a combination thereof.

16. The method of claim 13, wherein different groups of the plurality of mobile devices are managed by different entities, wherein the different entities comprise different first responder agencies, and wherein the one or more sensors include an accelerometer, a magnetometer, a compass, a gyroscope, a camera or any combination thereof.

17. The method of claim 13, wherein first and second mobile devices of the different mobile devices that capture the portion of the sensor data for the same building at the different times are managed by first and second entities that are different entities.

18. The method of claim 13, wherein the first path is represented in the presentation via a first color, and wherein the second path is represented in the presentation via a second color that is different from the first color.

19. The method of claim 13, wherein the first path is representative of first locations having been checked by the first first responder in the particular building and the second path is representative of second locations having been checked by the second first responder in the particular building, the second locations being different from the first locations.

* * * * *